United States Patent [19]

Haraguchi

[11] 4,342,508
[45] Aug. 3, 1982

[54] MIRROR OPERATING MECHANISM IN SINGLE-LENS REFLEX CAMERA

[75] Inventor: Keisuke Haraguchi, Ranzan, Japan

[73] Assignee: Asahi Kogaku Kogyo Kabushiki Kaisha, Tokyo, Japan

[21] Appl. No.: 300,866

[22] Filed: Sep. 10, 1981

[30] Foreign Application Priority Data

Sep. 10, 1980 [JP] Japan .......................... 55/128629[U]

[51] Int. Cl.³ ............................................ G03B 19/12
[52] U.S. Cl. ....................................... 354/152; 354/55
[58] Field of Search .............................. 354/152-156, 354/54-56

[56] References Cited

U.S. PATENT DOCUMENTS

| | | | |
|---|---|---|---|
| 3,332,331 | 7/1967 | Mandler | 354/55 |
| 3,401,614 | 9/1968 | Günther | 354/55 |
| 3,540,365 | 11/1970 | Ishizaka | 354/154 |
| 3,601,027 | 8/1971 | Ono | 354/55 |
| 4,103,311 | 7/1978 | Horigome | 354/152 |
| 4,311,376 | 1/1982 | Haraguchi | 354/153 |

*Primary Examiner*—Donald A. Griffin

*Attorney, Agent, or Firm*—Sughrue, Mion, Zinn, Macpeak & Seas

[57] ABSTRACT

In a single lens reflex camera of the type using a half-mirror and a total reflection mirror, a mirror operating mechanism is provided for automatically rotating the total reflection mirror against the light transmitting portion of the half-mirror as the half-mirror is raised to its photographing position. The second mirror holding frame is pivotably mounted to the first mirror holding frame and a second mirror operating lever pivotably mounted to the first mirror holding frame is coupled at one end to the second mirror holding frame. The other end of the second mirror operating lever abuts a fixed rotation angle limiting member as the first mirror holding frame is raised, thereby causing relative rotation of the second mirror operating lever with respect to the first mirror holding frame. The rotation angle limiting means is preferably a flexible member which will yield when the second mirror holding frame has rotated to its limit but the first mirror holding frame continues to rise. In the fully raised position, the total reflection mirror and the second mirror operating lever will together cover the light transmitting portion of the half-mirror.

7 Claims, 4 Drawing Figures

MIRROR OPERATING MECHANISM IN SINGLE-LENS REFLEX CAMERA

BACKGROUND OF THE INVENTION

This utility model relates to a mirror operating mechanism comprising a first mirror which is a half mirror adapted to separate a light beam from a photographing lens into a reflected light beam and a transmitted light beam and a second mirror which is a total reflection mirror adapted to reflect a light beam passed through the first mirror.

It is essential for a mirror operating mechanism for instance, in an automatic focus detecting device using a half mirror and a total reflection mirror, to introduce a light beam forming the image of an object to be photographed to a finder system and a focus detecting system simultaneously so that the light beam will form the image of the same object on the focusing screen in the finder system and on the focus detecting element in the focus detecting system. Furthermore, it is necessary that during the photographing operation the mirrors are retracted from the optical path in the photographing plane to prevent the occurrence of vignetting on the film surface, and when the mirrors are moved upwardly, the transmitted light beam passing window should be covered to prevent the formation of ghosts due to the leakage of light from the finder system and the reflection of light from the focusing screen. In addition, it is necessary to adjust the angle of the total reflection mirror to adjust the formation of an image on the focus detecting element.

In view of the foregoing, an object of this utility model is to provide a mirror operating mechanism which can satisfy all of the above-described requirements with a simple construction.

SUMMARY OF THE INVENTION

Briefly, the mirror operating mechanism according to the present invention comprises a first mirror holding frame holding the half mirror and being pivotably mounted to the mirror box, a second mirror holding member for holding the total reflection second mirror and being pivotably mounted to the first mirror holding frame, a second mirror operating lever pivotably mounted on said first mirror holding frame and being coupled on one side of its pivot point to the second mirror holding frame, and a rotation angle limiting device for engaging the second mirror operating lever on the other side of its pivot point as the mirror moves upwardly. As the mirror is raised, the rotation angle limiting device will continually press downwardly on the other end of the second mirror operating lever, to cause the second mirror to rotate toward the first mirror and cover a light transmitting aperture in the first mirror holding frame.

In the preferred embodiment of this invention, the rotation angle limiting device is elastic so that it will yield when the second mirror holding frame abuts the first mirror holding frame while the first mirror holding frame continues to rise. The angular orientation of the second mirror in the downward, or viewing, position is determined by a pin against which the second mirror holding frame is biased. Thus, the position of the second mirror can be easily adjusted by adjustment of the abutment pin.

BRIEF DESCRIPTION OF THE DRAWINGS

One example of a mirror operating mechanism according to this utility model will be described with reference to the accompanying drawings, in which.

DETAILED DESCRIPTION OF THE PREFERRED EMBODIMENT

Figure 1:
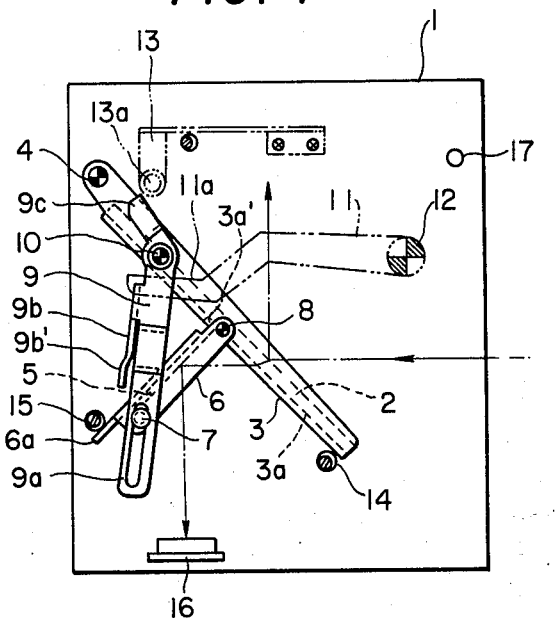
FIG. 1 is a side view showing a mirror operating mechanism according to this invention in an observation position.

In FIG. 1, reference numeral 1 designates a mirror box body; and 2, a half-mirror (hereinafter referred to as "a first mirror 2" when applicable), which is fixedly secured to a first mirror holding frame 3. The half mirror 2 will separate the incoming light beam into a reflected beam and a transmitted beam as shown.

The first mirror holding frame 3 has shafts 4 at one end, which are supported on portions 1a of the mirror box body. The frame 3 is urged clockwise by a first restoring spring (not shown) so that it is turnable about the shafts 4. However, in the observation position, the frame 3 is maintained stopped with a portion 3b (FIG. 4) of the frame 3 detained by a first mirror angle adjusting pin 14. A total reflection mirror 5 (hereinafter referred to as "a second mirror 5", when applicable) is fixedly held by a second mirror holding frame 6. A transmitted light beam passing window 3a is opened in the first mirror holding frame 3, to introduce a transmitted light beam to the second mirror 5. The second mirror holding frame 6 is mounted on shafts 8 embedded in both sides of the first mirror holding frame 3, so that it is turnable about the shafts 8 and is suspended from the first mirror holding frame 3.

A second mirror operating lever 9 is mounted on shafts 10 embedded in both sides of the first mirror holding frame 3 in such a manner that it is rotatable about the shafts 10 and is suspended from the first mirror holding frame 3. The lever 9 is urged clockwise by a second mirror restoring spring (not shown) which is weaker than the first mirror restoring spring (not shown). The torque of the lever 9 is transmitted to the second mirror holding frame 6 through an elongated groove 9a cut in the lever 9 and through a pin 7 embedded in one side of the second mirror holding frame 6; however, the frame 6 is maintained stopped as a portion 6a of the frame 6 is detained by a second mirror angle adjusting pin 15.

The second mirror operating lever 9 has one end portion 9c which is spaced some selected distance from a roller 13a on a rotation angle limiting plate 13 made of a flexible member such as a leaf spring, but the portion 9c is able to abut against the roller 13a. The other end portion of lever 9 is coupled through the elongated groove 9a to the pin 7 which is embedded in the side of the second mirror holding frame 6, as was described before. Both sides of the second mirror operating lever 9 are coupled through a coupling portion 9b having an integral bent portion 9b'.

A mirror up lever 11 (indicated by the two-dot chain line) is turned clockwise, about a shaft 12 secured to the mirror box body 1, by a mirror drive member (not shown), until its one end portion 11a abuts against the shaft 10 embedded in the first mirror holding frame 3.

In the figures, reference numeral 16 designates a focus detecting element disposed at a position equivalent to the film surface, the element 16 being held on the mirror box body 1, and reference numeral 17 designates a stopper for the first mirror holding frame 3 which is used when the mirror is swung upwardly.

The operation of the mirror operating mechanism will now be described.

Figure 2:
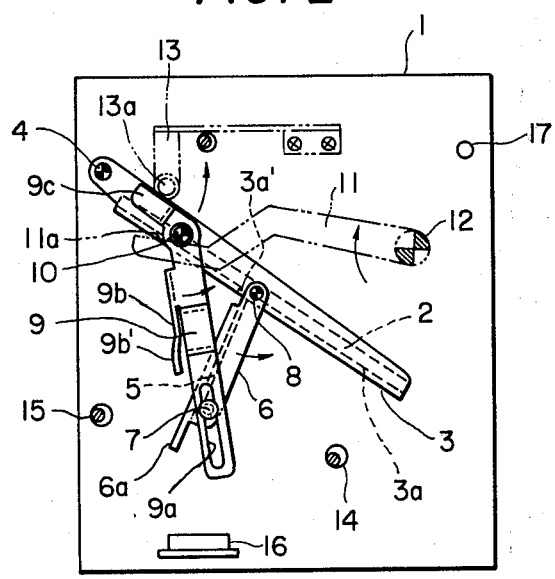
FIG. 2 is a side view showing the mirror operating mechanism in operation.
Figure 3:
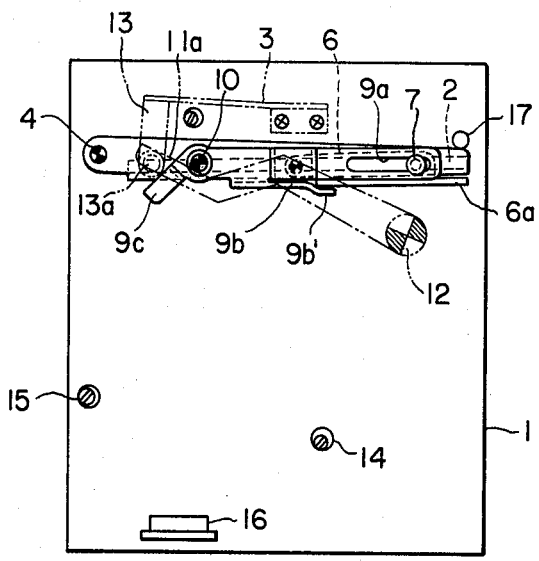
FIG. 3 is a side view showing the mirror operating mechanism in a photographing position.
Figure 4:
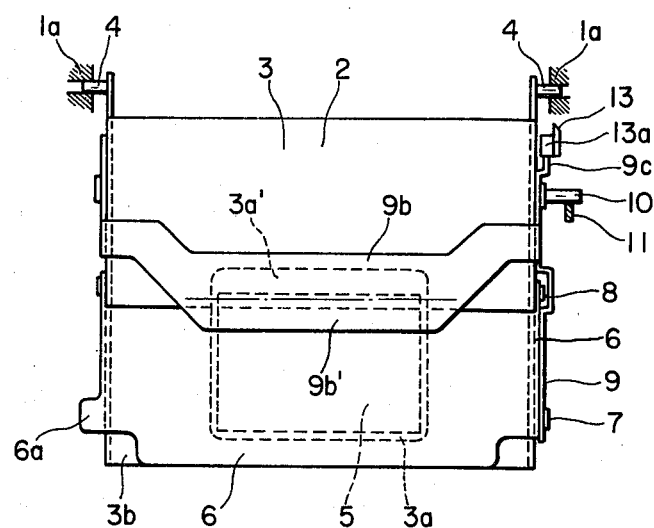
FIG. 4 is a diagram showing the coverage of the transmitted light beam passing window (3a and 3a') of the first mirror holding frame 3 as viewed from below the mirror box in FIG. 3.

When the mirror up lever 11 is turned clockwise by the mirror drive member (not shown), the one end portion 11a of the mirror up lever 11 abuts against the shaft 10 on the first mirror holding frame 3 to cause the latter 3 to turn counterclockwise about the shafts 4. In this operation, the fulcrum 10 is moved. Therefore, the end portion 9c of the second mirror operating lever 9 abuts against the roller 13a of the rotation angle limiting plate 13, and the second mirror operating lever 9 is thus turned with respect to the first mirror holding frame 3, as shown in FIG. 2. On the other hand, as the fulcrum 8 on the first holding frame 3 is moved, the second mirror holding frame 6 is turned counterclockwise by the rotation of the second mirror operating lever 9 via the pin 7 on the side of the second mirror holding frame 6, which (pin 7) is engaged with the elongated groove 9a of the lever 9. When the first mirror holding frame 3 strikes against the stopper 17, the frame 3 is stopped while still being maintained urged upwardly through the mirror up lever 11 by the mirror drive member (not shown) as shown in FIG. 3. On the other hand, as the end portion 9c of the second mirror operating lever is urged downwardly through the roller 13a by the flexibility of the rotation angle limiting plate 13 with the shaft 10 as the fulcrum, the second mirror holding frame 6 abuts against the first mirror holding frame 3 and is detained thereby. With the mirror in this position, the transmitted light beam passing window 3a of the first mirror holding frame 3 is substantially covered by the second mirror 5 and the second mirror holding frame 6, while a portion 3a' of the transmitted light beam passing window 3a in the vicinity of the fulcrum 8 of the second mirror holding frame 2 is covered by the coupling portion 9b and the bent portion 9b' of the second mirror operating lever 9 as shown in FIG. 4.

The angle adjustment of the second mirror 5 in the observation position as shown in FIG. 1 will now be described. The second mirror holding frame 6 is continually urged clockwise through the elongated groove 9a and the pin 7 on the side of the second mirror holding frame 6 by the clockwise energizing force of the second mirror operating lever 9. Therefore, the angle adjustment of the second mirror 5 can be achieved directly by adjusting the second mirror angle adjusting pin 15.

As described above, the fulcrums of the second mirror holding frame 6 and the second mirror operating lever 9 are provided on the first mirror holding frame 3, and the frame 6 and the lever 9 are coupled through the elongated groove 9a. The second mirror is moved upwardly together with the first mirror by turning the second mirror operating lever 9 relative to the first mirror with the rotation angle limiting plate 3. Thus, the mirror operating mechanism is highly reliable. The upward movement adjustment of the second mirror is eliminated by utilizing the flexiblity of the rotation angle limiting plate 13. When the mirror is moved upwardly, the transmitted light beam passing window 3a of the first mirror is covered by the second mirror 5 and the components of the second mirror operating lever 9, to prevent the leakage of light from the finder which may cause a harmful glare in the photographing plane during the photographing operation. Thus, the advantages in practical use of this invention should be highly appreciated.

What is claimed is:

1. In a single lens reflex camera of the type having a mirror box body, a half-mirror in said mirror box body for receiving an incoming image beam and separating said image beam into a reflected beam and a transmitted beam, said first mirror being movable between an observation position in the optical path of said incoming image beam and a photographing position out of the optical path of said incoming image beam, and a total reflection mirror for reflecting said transmitted beam, a mirror operating mechanism comprising:

a first mirror holding frame for holding said half-mirror and being pivotably mounted to said mirror box body;

a second mirror holding frame for holding said total reflection mirror and being pivotably mounted to said first mirror holding frame, said second mirror holding frame being pivotable with respect to said first mirror holding frame between an observation position and a photographing position;

a second mirror operating lever pivotably mounted via a pivot shaft to said first mirror holding frame, said second mirror operating lever being coupled on one side of said pivot shaft to said second mirror holding frame and having an abutment portion on the other side of said pivot shaft; and a rotation angle limiting means mounted on said mirror box body for engaging said abutment portion as said first mirror is moved toward its photographing position;

whereby said second mirror operating lever is rotated relative to said first mirror holding frame via pressure on said abutment portion by said rotation angle limiting means as said first mirror is moved toward its photographing position, thereby rotating said second mirror holding frame toward said first mirror holding frame and toward its photographing position.

2. A mirror operating mechanism as defined in claim 1, wherein said rotation angle limiting means comprises a flexible member which will yield under pressure from said abutment portion when said second mirror holding frame has reached its photographing position and said first mirror is still being moved toward its photographing position, whereby said second mirror holding frame will be elastically held in its photographing position by the flexibility of said rotation angle limiting means.

3. A mirror operating mechanism as defined in claim 2, wherein said second mirror operating lever is pivotably biased so as to urge said second mirror holding frame away from said photographing position, said mirror operating mechanism further comprising an adjustable abutment member against which said second mirror holding frame rests in its observation position.

4. A mirror operating mechanism as defined in claim 3, wherein the observation position of said second mirror holding frame is adjustable by adjusting the position of said adjustable abutment member.

5. A mirror operating mechanism as defined in claim 2, wherein said abutment portion and said rotation angle limiting means are spaced a predetermined distance apart when said first mirror and said second mirror holding frame are each in their observation positions.

6. A mirror operating mechanism as defined in claim 2, wherein said first mirror holding frame is provided with a light beam passing window through which said transmitted beam passes when said first mirror is in its observation position, said light beam passing window beam covered by said second mirror and said second mirror operating lever when said second mirror holding frame is in its photographing position.

7. A mirror operating mechanism as defined in claim 2, wherein said second mirror operating lever is coupled to said second mirror holding frame via an elongated groove cut in said second mirror operating lever and a pin embedded in said second mirror holding frame.

* * * * *